United States Patent [19]
Syska et al.

[11] Patent Number: 5,808,193
[45] Date of Patent: Sep. 15, 1998

[54] WATER CURRENT DIRECTION INDICATOR

[76] Inventors: Chester L. Syska, 41 Grandview Ave., Catskill, N.Y. 12414; Todd J. Syska, RR 1 Box 337, Spruce La., Clinton Corners, N.Y. 12514

[21] Appl. No.: 642,470

[22] Filed: May 3, 1996

[51] Int. Cl.[6] .................................................. G01P 13/02
[52] U.S. Cl. ......................................................... 73/170.05
[58] Field of Search .................................. 116/264, 265; 405/219; 114/162; 73/170.01, 170.05

[56] References Cited

U.S. PATENT DOCUMENTS 1,336,925  4/1920  Sakavye ................................. 73/170.05

FOREIGN PATENT DOCUMENTS 1 403 748  5/1965  France ................................. 73/170.05

Primary Examiner—David J. Bagnell
Assistant Examiner—Frederick L. Lagman

[57] ABSTRACT

A device designed to visually display water current direction in a body of water. The Water Current Direction Indicator consists of a rigid Indicating Pennant (10) and a Rudder (20) fixed, in the same plane, to a Shaft (30) which is allowed to freely rotate about it's longitudinal axes. Water pressure acting on the submerged Rudder (20) causes a rotation of Shaft (30) and thus causes the Pennant (10) to rotate and align itself with the direction of the water current.

1 Claim, 1 Drawing Sheet

WATER CURRENT DIRECTION INDICATOR

BACKGROUND

1. Field of Invention

This invention relates to a device for measuring and testing the prevailing current direction in a body of water; and more specifically is intended to provide a visual display of the prevailing water current direction in the vicinity of a dock or mooring for use by those operating water-craft in the area.

2. Description of Prior Art

Maneuvering of water-craft at slow speeds, in restricted areas or close to fixed objects or other water-craft can be difficult. Boats, seaplanes, and amphibious craft, while being operated on the surface of the water are all subject to having their course altered by several factors including wind and water currents. The effects of these factors becomes more apparent at slow speeds such as would be encountered when docking or maneuvering near other craft. Thus, when approaching a dock where a current exists it is important to be aware of the current direction so that a proper track can be executed.

Additionally, when docking a watercraft in an area with substantial current it is desirable to dock facing into the current. Watercraft are designed to be more maneuverable and create less drag when facing into the current, the direction of normal motion relative to the water. Besides being more maneuverable the craft will impart less pull on the mooring lines during the docking operation, and until such time as the craft is fully secured.

In many areas the direction of the water current is not constant but changes dependent on tide, wind, and possibility other factors. Numerous accidents and collisions happen each year, in and around dock areas, as a result of watercraft being forced unexpectedly from their intended path and colliding with stationary objects or other watercraft. Some of these accidents could be prevented if the operator of the watercraft had reliable information regarding the direction of the wind and water current in the vicinity of the dock.

Several devices designed to provide reliable indication of the wind direction are available and often one of these devices, most commonly a pennant or flag, is placed in a location of prominent visibility for use by the operators of watercraft in the vicinity. Additionally some boats are equipped with instrumentation to monitor wind direction. Galloway et al. U.S. Pat. 5,127,358; Jul. 7, 1992, has a modification to the common weather vain, designed to be mounted on the masthead of a sailboat, which contains reference marks which may be set for the optimal relative wind for the boat while under sail. Jordan, U.S. Pat. 3,691,828, Sep. 19, 1972, has a device similar to Galloway in that it is designed to display information regarding the wind direction relative to the axis of a sailboat but also provides for the installation of a remote wind indicator. Ahtohob, Russia, Patent 1,767,442, October 1992, uses a "baffle" similar to a rudder which is acted upon by the air flowing through a duct to activate a relay which intern controls other devices. None of these devices are designed to or provide the pilot of a watercraft information concerning the direction of the water current during docking operations.

A check of the prior art reviled no devices designed to provide a reliable means of obtaining and displaying the direction of the water current. Until now operators of water-craft were forced to obtain current information by becoming motionless relative to the water and observing their drift in relation to some fixed object, or by observing the ripples produced as water flowed around some fixed object such as a piling or dock post, or by observing the movement of floating debris or objects on the surface of the water. Levy, U.S. Pat. No. 3,869,911 Mar. 11, 1975, expanded upon this floating debris principal by attaching a floating device to a piling. Levy's device was made visible by a fixed pointer fastened to a support pole on the float. The float would pivot around the piling and locate itself down current with the fixed pointer pointing away from the piling and pointing in the direction of current flow.

The disadvantage of Levy's device is that it requires the ability to freely move in a full circle about the piling to which it is fastened. Not all docks have pilings suitable for the attachment of Levy's device. Many boats dock to solid concrete peers or seawalls and Levy's device would require that a dedicated piling be placed away from the dock where it may itself be a hazard to navigation. If the dock is mounted on pilings Levy's device requires that sufficient clearance remain around and above the device at all times to insure freedom of movement. Docks for small boats are typically floating docks designed to remain close to the surface of the water. This would prevent Levy's device from having full freedom of movement necessary for it's operation or would place the device under the dock and out of site during certain conditions.

The other methods mentioned are also unreliable methods for determining the current direction. One depends on the chance that sufficient debris will be floating to be noticeable; another depends on the current being sufficiently strong to create ripples visible to the operator of the water-craft, and one requires the operator to completely stop the water-craft in relation to the water. Sometimes, as in the case of most small seaplanes, this will require the operator to stop the engine which can place the craft at risk should it become necessary to move the craft quickly or should a restart prove difficult or impossible without assistance; at the least this is an inconvenient method for determining the prevailing water current direction.

OBJECTS AND ADVANTAGES

Accordingly, several objects and advantages of this invention are: it provides operators of water-craft a reliable means of determining the prevailing water current direction in the vicinity of their craft, and it displays the information pertaining to the water current direction visually and in an easily recognizable manor.

LIST OF REFERENCE NUMERALS

Figure 1:
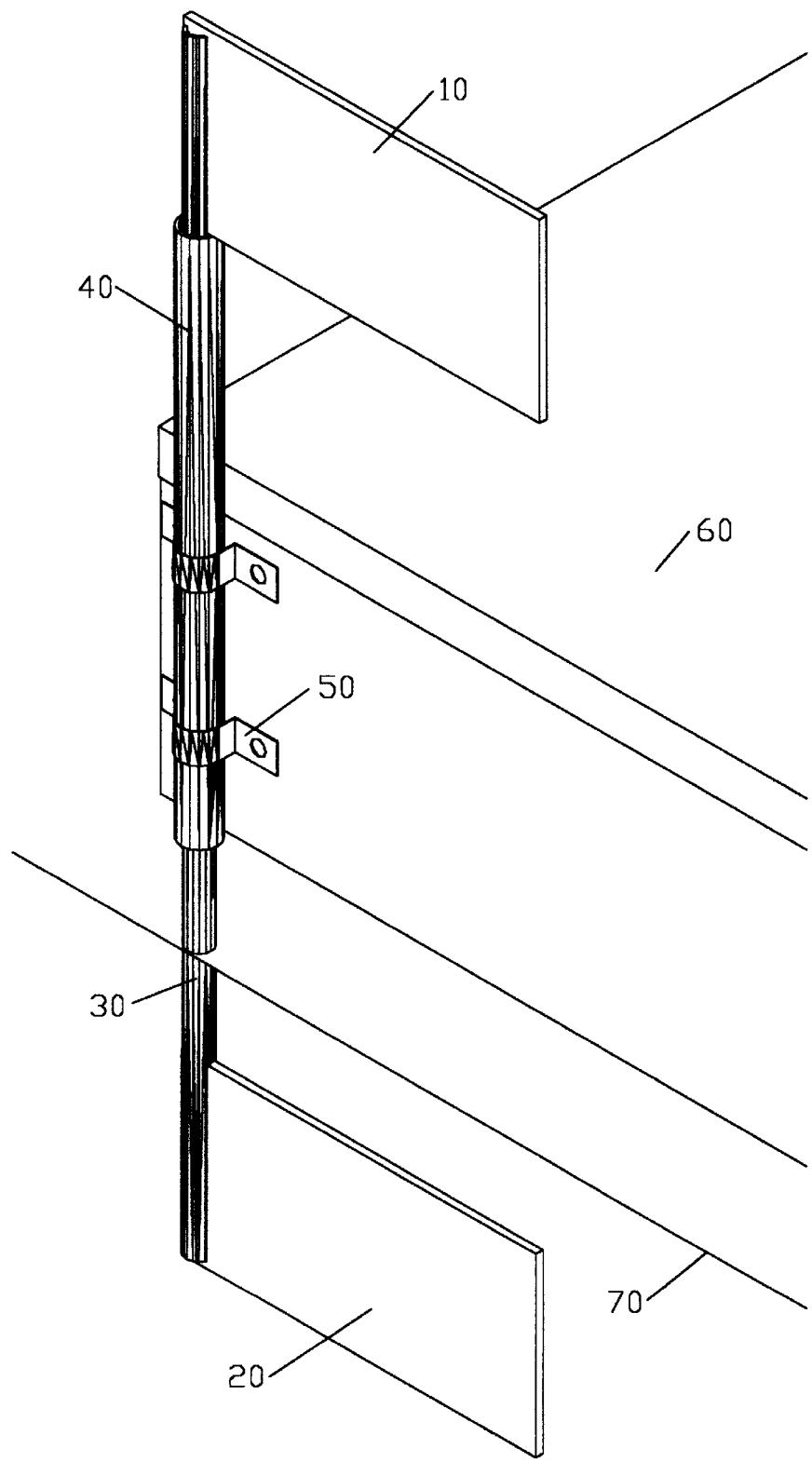
FIG. 1 Water Current Direction Indicator, showing all major components and mounting hardware.

10 Current Direction Indicator Pennant
20 Rudder
30 Shaft
40 Support Tube
50 Support Tube Mount
60 Dock, Floating or Fixed
70 Water Level

SUMMARY

The force exerted on a stationary object by water flowing around and past the object may be used to move an indicator in order to display the direction of the prevailing water current.

DETAILED DESCRIPTION OF INVENTION

Current Direction Indicator Pennant 10, and Rudder 20 are constructed of ridged material such as sheet metal or ridged plastic sheeting. Pennant 10 is then attached to Shaft 30. One method of attachment is to cut a notch, of appropriate width and depth for Pennant 10, in the end of Shaft 30, placing Pennant 10 in the notch, insuring that adequate projection remains on both sides to act as a pivot surface, and using suitable glue or other means attach Pennant 10 securely in the notch, in a manor which prevents any movement.

Support Tube 40 is fabricated from tubing with sufficient diameter to allow Shaft 30 to pass through and provide sufficient clearance for rotation of Shaft 30 about the longitudinal axes within the confines of the diameter of Support Tube 40.

Shaft 30 with the attached Pennant 10 is slipped through the diameter of Support Tube 40 until the end of Shaft 30 is projecting from Support Tube 40. Rudder 20, is attached to the end of Shaft 30 in a manor similar to that used for the attachment of Pennant 10. This attachment must be made so that Current Indicator Pennant 10 lies and is permanently fixed in the same plane as Rudder 20, that is the two must point in the same direction at all times.

The Current Direction Indicator Assembly is mounted to Dock 60 using Mounting Clamps 50. To accomplish this suitable fasteners are placed through the holes in mounting clamps provided for this purpose. When properly fastened the Current Direction Indicator is secured in a vertical position, and fastened in such a manor that Shaft 30 with the attached Rudder 20 and Pennant 10 is free to rotate about the longitudinal axes without interference or obstruction. Proper height is such that Rudder 20 remains submerged below Water Level 70 at all times. To accomplish this the length of Shaft 30 and Support Tube 40 must be sufficient to accommodate changes in water level due to tides or other factors. Alternately the Current Direction Indicator assembly could be attached to a structure which maintains a constant elevation relative to the water surface such as a floating dock.

This completes the assembly of the Current Direction Indicator. Materials used in the construction will have and effect on the overall performance. Shaft 30 and Support Tube 40 must be ridged enough to remain vertical, once mounted, and must be made of materials able to resist the effects of weather and the harsh marine environment; PVC tubing makes an excellent choice.

The Current Direction Indicating Pennant 10 should be made large enough to be clearly seen when approaching the dock yet not so large in comparison to Rudder 20 to allow the wind to overpower the rotational forces acting on Rudder 20. The size of the Rudder 20 should be such that it provides sufficient rotational forces to give a reliable indication of current direction when other forces such as frictional forces within the device and the rotational effects of the wind on Pennant 10 are considered.

The length of Shaft 30 and Support Tube 40 must be sufficient to attach to the selected mounting location and extend upward sufficiently to allow Pennant 10 to be located at the desired height while Rudder 20 remains submerged.

OPERATION OF INVENTION

Mount the assembled Current Indicator to a Dock or in another suitable location. A suitable location is one that offers good visibility of the Current Indicator Pennant and allows for complete freedom of rotation for the Rudder and Indicator Pennant, and insures that the Rudder remains completely submerged at all times.

Water pressure flowing by the submerged Rudder causes the Rudder to rotate and align itself with the direction of least resistance, the direction of the current flow. This causes a rotational force to be imparted to the Shaft which caused a rotation of the Current Direction Indicator Pennant which is fixed to the Shaft in a manor that insures alignment with the Rudder. Thus the Current Indicator Pennant becomes aligned and displays the direction of the water current acting on the Rudder.

For proper operation the Current Indicator Assembly should be mounted so that the Rudder is completely submerged. It is recommended that the rudder be submerged to a depth of approximately 12 inches to minimize the adverse effects of small ripples on the water's surface. A deeper submergence may be necessary in some locations to avoid false current readings caused by wave action.

This is not the only design which will serve for the construction of the current direction indicator. What is important to the functionality of the device is that a freely rotating shaft is mounted in such a manor that a rudder once secured to the end of this shaft and placed below water level reliably conveys information about the water current direction to a device designed to display this current direction in an easily recognized manor. Transmission of the current direction information to the display device is not limited to purely mechanical means. The current direction information could be converted to other forms of energy such as light or electricity for transmittal to an appropriate display unit.

CONCLUSION, RAMIFICATION, AND SCOPE OF INVENTION

Thus the reader will see that the invention when properly installed will provide a reliable means for determining the direction of the water current in the vicinity of the indicator.

While my above description contains many specifications, these should not be considered as limitations to the scope of my invention, but rather as an exemplification of one preferred embodiment thereof. Many other variations are possible and although primarily designed to assist the operators of watercraft the device may be used, with minor modifications, to display the current direction of any fluid flowing in either an open or closed channel.

We claim:

1. A device, mounted on a dock, for displaying the prevailing current direction in a body of moving water, comprising:
   (a) a support tube adapted to be mounted on said dock:
   (b) a shaft rotatably inserted within the said support tube;
   (c) a current direction indicator attached to one end of said shaft, said current direction indicator composed of a sheet of rigid material sized and placed to be visible when approaching the dock; and,
   (d) a rudder attached to the other end of said shaft such that the rudder is in the same plane as the said current direction indicator, said rudder composed of a sheet of rigid material such that when placed in the said body of moving water the force imparted to said rudder, by the current, will cause rotation of said shaft thereby rotating said current direction indicator to display the prevailing current direction.

* * * * *